United States Patent [19]
Ausbeck, Jr.

[11] Patent Number: 5,917,953
[45] Date of Patent: Jun. 29, 1999

[54] GEOMETRY IMPLICIT SAMPLER FOR POLYNOMIAL SURFACES OVER FREEFORM TWO-DIMENSIONAL DOMAINS

[75] Inventor: Paul James Ausbeck, Jr., Campbell, Calif.

[73] Assignee: The Morgan Crucible Company plc, Berkshire, United Kingdom

[21] Appl. No.: 08/889,005

[22] Filed: Jul. 7, 1997

[51] Int. Cl.$^6$ .............................. G06K 9/36; G06K 9/46; G06K 9/00

[52] U.S. Cl. ...................... 382/239; 382/243; 382/291; 382/151

[58] Field of Search .................................. 382/232, 238, 382/239, 241, 243, 244, 248, 251, 291, 151, 173; 345/202; 348/404, 405; 358/216.2

[56] References Cited

U.S. PATENT DOCUMENTS 5,734,756  3/1998  Sherman et al. ..................... 382/259

*Primary Examiner*—Bipin Shalwala
*Attorney, Agent, or Firm*—Kilpatrick Stockton LLP; Dean W. Russell, Esq.; Bruce D. Gray, Esq.

[57] ABSTRACT

In two-dimensional model based image coding, an image is partitioned into domains, and the pixels of each domain are modeled with a polynomial intensity function. An image coded in this fashion is comprised of a description of the domain boundaries and individual descriptions of polynomial intensity functions. In order to trade rate for distortion it is desirable that the accuracy of the descriptions be proportional to their length. A polynomial description that is natural for trading rate for distortion is a sequence of samples of its generated surface. If the locations of the samples are implicitly determined from domain shape, an n term polynomial description is comprised of n sample values, and rate is traded for distortion via sample value quantization. In order to bound the sample values to the dynamic range of the image, their locations must be constrained to lie within their associated domain. The present invention is a method for implicitly determining appropriate locations within a freeform two-dimensional domain at which to sample a polynomial surface over the domain such that when the surface is recovered from the samples it accurately reflects the sampled surface and is minimally sensitive to sample value changes. The method determines sample locations solely from domain shape and the expected number of polynomial terms. The number of sample locations determined is nominally equivalent to expected number but is reduced if appropriate locations cannot be found. The method is comprised of two orthogonal one-dimensional samplers and a reduced two-dimensional sampler largely confined to the associated domain's periphery. Algorithmic complexity is O($\sqrt{N}$) where N is the number of pixels in the sampled domain.

7 Claims, 11 Drawing Sheets

---

Decode the Polynomial Order of the Model, *O\**

Decode the Boundaries Between Domains\*

For each Domain of the Model:

Decode the Quantizer Step Size, *S\**

Perform an Order *O* Geometry Implicit Sampling

For each Determined Sample Location:

Decode a Quantized Sample Value\*

Inverse Quantize the Decoded Value using *S*

Reconstruct a Polynomial Intensity Function from the Samples

Fill the Domain Using the Reconstructed Intensity Function $D_O = 36$ $D_I = 36$ $D_O = 27$ $D_I = 12$ $D_O = 104976$ $D_I = 104976$ $D_O = 77396705279$ $D_I = 61917364223$ $D_O = 25344$ $D_I = 23328$ $D_O = 2070282240$ $D_I = 2038431744$ $D_O = 6480$ $D_I = 5832$ $D_O = 59719680$ $D_I = 31850496$ $D_O = 26244$ $D_I = 26244$ $D_O = 603979776$ $D_I = 318504960$ $D_O = 104976$ $D_I = 52488$ $D_O = 22932357120$ $D_I = 11466178560$ $D_O = 20832$ $D_I = 20736$ $D_O = 1492992000$ $D_I = 1492992000$ $D_O = 10000$ $D_I = 4096$ $D_O = 217728000$ $D_I = 14929920$ Extract a Two-Dimension Image Model of Order $O$ Encode $O*$ Encode the Boundaries Between Domains*

For each Domain of the Model:

Determine an Appropriate Quantizer Step Size, $S$

Encode $S*$

Perform an Order $O$ Geometry Implicit Sampling

For each Determined Sample Location:

Sample the Image Model at that Location

Quantize the Resulting Value using $S$

Encode the Quantized Value*

FIG. 41

Decode the Polynomial Order of the Model, $O*$

Decode the Boundaries Between Domains*

For each Domain of the Model:

Decode the Quantizer Step Size, $S*$

Perform an Order $O$ Geometry Implicit Sampling

For each Determined Sample Location:

Decode a Quantized Sample Value*

Inverse Quantize the Decoded Value using $S$

Reconstruct a Polynomial Intensity Function from the Samples

Fill the Domain Using the Reconstructed Intensity Function

FIG. 42

GEOMETRY IMPLICIT SAMPLER FOR POLYNOMIAL SURFACES OVER FREEFORM TWO-DIMENSIONAL DOMAINS

FIELD OF THE INVENTION

The invention relates to two-dimensional model based image coding. In particular, it applies to the recovery of two-dimensional polynomial surfaces from surface samples. Reference Murat Kunt, Michel Benard, and Riccardo Leonardi, "Recent Results in High-Compression Image Coding", IEEE Transactions on Circuits and Systems, Vol. CAS-34, No. 11, November 1987, 1306–1336.

Oh-Jin Kwon and Rama Chellappa, "Segmentation-based image compression", Optical Engineering, Vol. 32 No. 7, July 1993, 1581–1587.

Paul J. Ausbeck Jr., copending U.S. Patent entitled "Image Partition Moment Operators".

BACKGROUND OF THE INVENTION

In two-dimensional model based image coding, an image is partitioned into connected two-dimensional discrete domains, each modeled with its own polynomial intensity function. The two components of such a code are a description of the domain boundaries and a description of the polynomial intensity unctions. The descriptions are typically separate, with each domain's boundary description occurring before its polynomial intensity function in a coded bit stream.

Two-dimensional model based coding is a form of lossy image coding, where the coded image is not identical to its source. The distortion of a coded image measures the degree to which it differs from its source image. The rate of a coded image is the length of its coded description in bits divided by its pixel count. A low distortion encoding has a relatively higher rate than a high distortion encoding of the same source, but it more closely matches the source.

For a lossy coding scheme to have general applicability, it must be able to smoothly trade rate for distortion. A two-dimensional model based coder typically trades rate for distortion by altering the number of domains in the image model. However, this mechanism is not able to fully take advantage of the properties of the human visual system that make it more sensitive to certain types of errors than others. For example, the visual property known as intensity masking makes it more difficult for a human observer to distinguish between two slightly different relatively dark areas of an image if they abut a relatively bright area than if they abut only other relatively dark areas. The variable visual sensitivity to spatial frequency makes it more difficult for an observer to discern intensity changes in highly textured or large gradient regions of an image than in relatively smooth regions.

Since the domains of a two-dimensional image model typically are significantly aligned with image features, a natural way to take advantage of human visual system properties is to represent the polynomial intensity unctions of some domains more accurately than others. Of course to make this technique useful, a method for trading rate for polynomial distortion must be available.

One polynomial description appropriate for trading rate for distortion is a sequence of samples of the generated surface. A critical sampling makes only one sample per term of the generating polynomial and is most applicable to coding. An n term polynomial surface is recovered from n samples by solving a simultaneous system of n equations and n unknowns. For example, a planar surface $$z(x,y)=ax+by+c \quad (1)$$

can be recovered from three sample points $(x_n, y_n, z_n)$, by solving the system of equations $$ax_1 + by_1 + c = z_1 \quad (2)$$
$$ax_2 + by_2 + c = z_2$$
$$ax_3 + by_3 + c = z_3$$

for the unknown coefficients a, b, and c.

Given appropriate sample (x,y) coordinates or locations, the accuracy of a polynomial surface recovered from samples is proportional to the accuracy of the sample z coordinates or values. A natural way to trade polynomial descriptive bits for image distortion is to quantize the sample values representing each polynomial surface. Quantized samples can take on only a relatively small number of values. Coarsely quantized samples have fewer possible values than finely quantized samples. As quantization becomes more coarse, the number of bits necessary to represent each value decreases. Distortion is increased, however, since the polynomial surface recovered from coarsely quantized values is likely to be an inferior intensity function compared to the surface from which the samples were taken.

In order that fixed point numbers may be used to represent quantized values, it is desirable to fix their dynamic range. In two-dimensional model based codes the polynomial intensity functions commonly used are interpolating polynomials. Therefore, samples of a polynomial intensity function taken within its associated domain are guaranteed to lie within the dynamic range of the of the image. For example, samples of a surface interpolating a 256 level grayscale image are guaranteed to fit into unsigned eight bit integers. Samples of such a surface made just outside its interpolating region are not so guaranteed.

To recover a polynomial surface from quantized samples, at least three types of information must be available: the polynomial terms to be recovered, sample locations and sample values. In order to effectively trade rate for distortion, the major part of a coded polynomial description must consist of sample values. Conversely, the other two parts of a coded description, the polynomial terms to be recovered and the sample locations, must have a minimal descriptive length.

In two-dimensional model based codes, the recoverable polynomial terms are frequently restricted to a small number of sets determined by the largest exponent. Commonly used sets are the maximal polynomials of a given integer order. Such polynomials consist of all possible terms with combined power of x and y less than or equal to the corresponding order. The first four maximal two-dimensional polynomials are comprised of one, three, six and ten terms respectively. Due to the restriction on the number of possible polynomials, the number of bits necessary to code the polynomial terms to be recovered for each domain is rather small. Further, it is common for a single polynomial order to apply to every domain of a coded description. In such cases, the number of bits necessary to specify the recoverable terms of each polynomial is effectively zero.

It is desirable to also reduce the number of bits necessary for describing sample locations to zero. One way this might be accomplished is to infer sample locations from other information the coded description. In an encoded two dimensional image model the relevant information available for inferring appropriate sample locations consists of polynomial order and domain shape. If domains are allowed to take on only certain shapes, several fixed regular sampling patterns may be applicable. However, for freeform domains a small number of sampling patterns is inadequate since some samples will invariably fall outside of their associated domain. Sample values at such locations are not guaranteed to lie within the dynamic range of the image. A freeform domain may also have an inappropriate shape to support all the terms of a given maximal polynomial order. For example, a domain that is only one pixel wide cannot support polynomial terms containing x, or a domain that is only one pixel tall cannot support terms in y.

Therefore, there is a need for a method for implicitly determining appropriate locations within a freeform two-dimensional domain at which to sample a polynomial surface over the domain such that when the surface is recovered from the samples it is both accurate and minimally sensitive to changes in sample values. The method should determine sample locations solely from domain shape and maximal polynomial order. The number of sample locations should be nominally equivalent to the number of terms of the polynomial generating the surface but should be reduced if appropriate locations cannot be found.

PRIOR ART

While recovery of polynomials from samples is widely mentioned in the image processing literature, there does not appear to be any prior art on exactly how to locate sample points that are appropriate for polynomial recovery. In "Recent Results in High-Compression Image Coding", IEEE Transactions on Circuits and Systems, Vol. CAS-34, No. 11, November 1987, 1306–1336, Kunt, et al suggest polynomial recovery from r regularly spaced pixels represented with eight bit accuracy. In "Segmentation-based image compression", Optical Engineering, Vol. 32 No.7, July 1993, 1581–1587, Kwon, et al state "Coefficients of the polynomials for uniform regions . . . are quantized using 8 bits each." Other similar references to recovery from undefined eight bit samples exist.

SUMMARY OF THE INVENTION

The present invention is a method for geometry implicit sampling of polynomial surfaces over freeform two-dimensional discrete domains. It is comprised of two orthogonal one-dimensional samplers and a reduced two-dimensional sampler that is largely confined to domain periphery. The one-dimensional samplers determine sample locations appropriate for supporting polynomial terms containing only a single variable and the reduced two-dimensional sampler determines appropriate locations for supporting mixed terms. Complete details of the method are disclosed for sampling maximal two-dimensional polynomial surfaces of order one, two, and three. For domains that are largely convex, the computational complexity of the method is $O(\sqrt{N})$ where N is the number of possible domain sample locations.

The method is comprised of a basic sampler plus extensions. The basic sampler is appropriate for domains that are large, convex, and unincluded. Small, convex, and included domains are handled via the extensions. The extensions operate by moving certain locations identified by the basic method, and by marking certain locations identified by the basic method as inappropriate or redundant.

The basic method first identifies two orthogonal one-dimensional domains within the encompassing two-dimensional domain. The one-dimensional domains are sampled via a disclosed optimal one-dimensional sampler. The orthogonal one-dimensional domains then form a coordinate system for performing reduced two-dimensional sampling. A greedy procedure is disclosed for selecting up to three mixed sample locations from either the domain's periphery or from a single distinguished internal location.

The disclosed optimal one-dimensional sampler is appropriate for contiguous domains. For concave or included domains the one-dimensional domains selected for sampling may not be contiguous. In such cases one or two optimal locations may not lie within the encompassing two-dimensional domain. An extension of the basic method adjusts any one-dimensional sample locations not lying within the encompassing domain to the closest available collinear locations within the encompassing domain.

When sampling a domain whose shape does not support all the polynomial terms of a desired order, the locations determined by the basic method may be duplicated or be otherwise inappropriate. An extension of the basic method identifies redundant or inappropriate locations lying within the orthogonal one-dimensional domains. Another extension identifies inappropriate mixed locations that either lie within the one-dimensional domains or are collinear with each other or with the chord intersection.

DETAILED DESCRIPTION OF THE INVENTION

Two-dimensional polynomials

Figure 1:
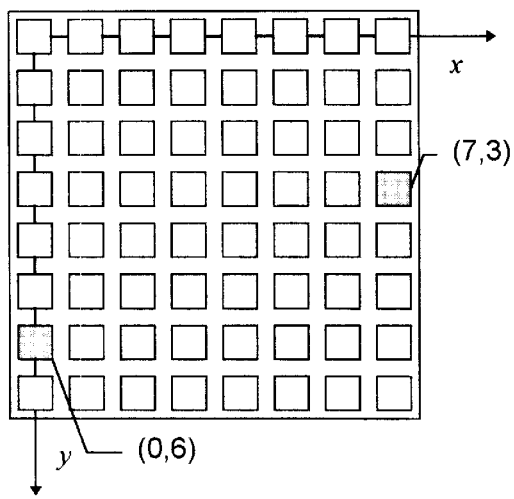
FIG. 1 shows an 8×8 domain of a two-dimensional discrete lattice and an associated coordinate axis.

The polynomials commonly used in two-dimensional model based image coding are classified by their largest combined power of x and y. For a given largest power, the polynomial containing all possible terms has the best isotropic behavior. The largest power of a maximal two-dimensional polynomial is its order, symbolically denoted $P_{max}$. The first four maximal two-dimensional polynomials are $$f_0(x,y) \equiv c_-, \quad (3)$$

$$f_1(x,y) \equiv c_x x + c_y y + f_0(x,y), \quad (4)$$

$$f_2(x,y) \equiv c_{x^2} x^2 + c_{y^2} y^2 + c_{xy} xy + f_1(x,y), \quad (5)$$

$$f_3(x,y) \equiv c_{x^3} x^3 + c_{y^3} y^3 + c_{x^2y} x^2 y + c_{xy^2} xy^2 + f_2(x,y). \quad (6)$$

Geometry Implicit Sampling

Given a freeform two-dimensional domain and a polynomial surface over the domain the geometry implicit sampling problem is to find appropriate locations within the domain at which to sample the surface such that a polynomial recovered from the samples accurately models the sampled surface and is minimally sensitive to sample value changes. A geometry implicit sampler must determine sample locations solely from domain shape and the order of the sampled surface.

The lowest order polynomial where geometry plays a role in sampling is the first order polynomial. The most straightforward system of sample point equations from which a first order two-dimensional polynomial can be recovered is written in matrix form as $$\begin{bmatrix} x_1 & y_1 & 1 \\ x_2 & y_2 & 1 \\ x_3 & y_3 & 1 \end{bmatrix} \cdot \begin{bmatrix} c_x \\ c_y \\ c \end{bmatrix} = \begin{bmatrix} z_1 \\ z_2 \\ z_3 \end{bmatrix}, \quad (7)$$

or in abbreviated form as $$A_1 \cdot x_1 = b_1. \quad (8)$$

The determinant of the first order two-dimensional system matrix, $A_1$, is $$D_{21} = x_1 y_2 - x_1 y_3 - x_2 y + x_2 y_3 + x_3 y_1 - x_3 y_2, \quad (9)$$

and the solution for polynomial coefficients is $$\begin{bmatrix} c_x \\ c_y \\ c \end{bmatrix} = \frac{1}{D_{21}} \cdot \begin{bmatrix} y_2 - y_3 & y_3 - y_1 & y_1 - y_2 \\ x_3 - x_2 & x_1 - x_3 & x_2 - x_1 \\ x_2 y_3 - x_3 y_2 & x_3 y_1 - x_1 y_3 & x_1 y_2 - x_2 y_1 \end{bmatrix} \cdot \begin{bmatrix} z_1 \\ z_2 \\ z_3 \end{bmatrix}. \quad (10)$$

Note that the solution is composed of a geometry independent part, represented by the sample value vector, and a geometry dependent part, represented by the inverted sample location matrix.

Polynomial coefficient sensitivity to sample value changes is obtained by differentiating the solution with respect to each sample value. For example, the coefficient sensitivity to changes in the first sample value is:

$$\frac{\partial}{\partial z_1} \begin{bmatrix} c_x \\ c_y \\ c \end{bmatrix} = \frac{1}{D_{21}} \cdot \begin{bmatrix} y_2 - y_3 \\ x_3 - x_2 \\ x_2 y_3 - x_3 y_2 \end{bmatrix}. \quad (11)$$

Differentiation with respect to all three sample values yields nine sensitivities. Note that the sensitivities are determined solely from geometry dependent information.

The main goal of a geometry implicit sampler is to choose sample locations such that the magnitudes of all sensitivities are jointly minimized. One method applicable to minimizing sensitivities subject to boundary constraints is linear programming. Given an appropriate cost function, linear programming mechanically searches a feasible set for a low cost solution. Unfortunately, linear programming is not a viable technique for geometry implicit sampling of freeform domains since there is insufficient boundary structure to form an efficient feasible set.

One element that is universally applicable to any optimization technique is the cost unction. One possible cost function for geometry implicit sampling is the sum of the squares of the sensitivities. However, even for this first order example which is the simplest of interest, such a cost unction is quite elaborate.

One observation is that all sensitivities are divided by $D_{21}$. If $|D_{21}|$ is large then all sensitivities are small. $|D_{21}|$ is a reasonably simple cost function, but it is still not clear how to choose sample locations that maximize its value. A second observation is that if $y_1 = y_2$ then $D_{21}$ reduces to $$D_{21S} = (x_2 - x_1) \cdot (y_3 - y_1). \tag{12}$$

This constraint has the effect of separating the two-dimensional problem into two one-dimensional problems. The optimal locations under the separation constraint are the two locations with identical y coordinates that maximally differ in x and a third location that maximally differs in y from the other two.

The idea of problem separation is extendible to higher order polynomials in a fairly general way. The remaining discussion defines a freeform two-dimensional sampler that is comprised of two orthogonal one-dimensional samplers and a reduced two-dimensional sampler referenced to the coordinate system defined by the one-dimensional samplers.

One-dimensional Sampling

Given a one-dimensional domain of length $l_{max} - l_{min}$ and a polynomial curve of a given order over the domain, the one-dimensional geometry implicit sampling problem is to find appropriate locations at which to sample the curve such that an equivalent order polynomial recovered from the samples accurately reflects the sampled curve and is minimally sensitive to sample value changes. Unlike the two-dimensional sampling problem, when sampling curves of the orders of interest, $$f_1(l) \equiv c_l l + c, \tag{13}$$

$$f_2(l) \equiv c_{l2} l^2 + c_l l + c, \tag{14}$$

$$f_3(l) \equiv c_{l3} l^3 + c_{l2} l^2 + c_l l + c, \tag{15}$$

the one-dimensional problem has closed form optimal solutions

The recovery equations for the first order one-dimensional curve are $$\begin{bmatrix} l_1 & 1 \\ l_2 & 1 \end{bmatrix} \cdot \begin{bmatrix} c_l \\ c \end{bmatrix} = \begin{bmatrix} z_1 \\ z_2 \end{bmatrix} \tag{16}$$

and the determinant of the one-dimensional first order recovery matrix is $$D_{11} = l_1 - l_2. \tag{17}$$

The determinant magnitude is maximized when $l_1 = l_{min}$ and $l_2 = l_{max}$ or vice versa. Placing the optimal locations into a vector yields the first order one-dimensional sample location vector $$l_1 = \begin{bmatrix} l_{min} \\ l_{max} \end{bmatrix}. \tag{18}$$

For the second order problem the determinant of the recovery matrix is $$D_{12} = (l_1 - l_2)(l_3 - l_1)(l_3 - l_2). \tag{19}$$

Again the determinant magnitude is maximized by placing two sample locations at the domain endpoints. If $l_1$ and $l_3$ are placed at $l_{min}$ and $l_{max}$ respectively, the derivative of (19) with respect to $l_2$ has a local maximum at the interior location $$l_2 = \frac{l_{max} - l_{min}}{2}, \tag{20}$$

leading to the second order one-dimensional sample location vector $$l_2 = \begin{bmatrix} l_{min} \\ \frac{l_{max} - l_{min}}{2} \\ l_{max} \end{bmatrix} \tag{21}$$

The determinant of the third order recovery matrix is $$D_{13} = (l_1 - l_2)(l_4 - l_1)(l_4 - l_2)(l_3 - l_1)(l_3 - l_2)(l_3 - l_4). \tag{22}$$

Again the determinant magnitude is maximized by placing two sample locations at the domain endpoints. If $l_1$ and $l_4$ are placed at $l_{min}$ and $l_{max}$ respectively, differentiation of (19) with respect to $l_2$ and $l_3$ leads to a system of two equations and two unknowns that is solvable for the two optimal interior locations. The third order one-dimensional sample location vector is $$l_3 = \begin{bmatrix} l_{min} \\ \frac{l_{min} + l_{max}}{2} - \frac{\sqrt{5}}{10}(l_{max} - l_{min}) \\ \frac{l_{min} + l_{max}}{2} + \frac{\sqrt{5}}{10}(l_{max} - l_{min}) \\ l_{max} \end{bmatrix} \tag{23}$$

Domain Chords

To apply the previously developed one-dimensional results to two dimensions, a mechanism for identifying one-dimensional subsets of a two-dimensional domain is needed. FIG. 1 shows an 8×8 square domain of a discrete two-dimensional lattice. On a discrete lattice, only integer coordinates have meaning. On FIG. 1 valid locations are indicated with small squares, simulating pixel sites on a display device. Example coordinates in the defined coordinate system are given for two example locations colored in gray.

Figure 2:
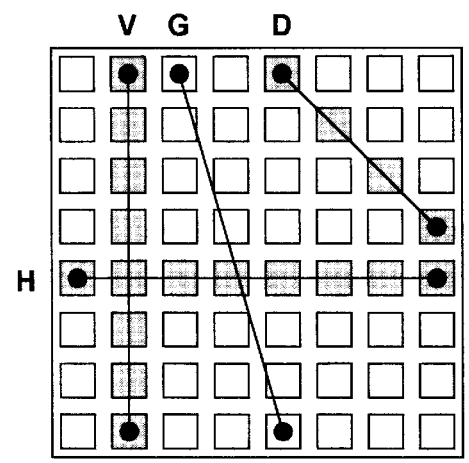
FIG. 2 shows general, horizontal, vertical, and diagonal chords of an 8×8 square domain.

FIG. 2 shows example chords for an 8×8 square domain. A chord is a line segment drawn between two peripheral locations in a domain. The two locations between which a chord is drawn are its endpoints. The chord labeled G on FIG. 2 is an example of a general chord. A general chord is not particularly useful in identifying a one-dimensional discrete domain in that it passes through pixels that are not collinear in any rotated coordinate system. The three types of chords that unambiguously identify a one-dimensional domain are the vertical, horizontal, and diagonal chords. Examples of these chord types are labeled V, H, and D on FIG. 2.

Two orthogonal chords of a domain may or may not intersect. Regardless of whether or not an intersection actually exists, the intersection of two orthogonal chords is defined as the location where the intersection would occur if both were extended to infinite length. The coordinates of a chord intersection are $(x_c, y_c)$.

Domain Boundaries

The peripheral subset, R, of a two-dimensional domain consists of all locations on its periphery. If lattice locations are modeled as squares, a boundary is composed of square sides shared by locations in different domains. A boundary location shares a side with another boundary location in an adjacent domain. Relative to a given domain, an adjacent domain may be either internal or external. A peripheral location is a boundary location adjacent to an external domain.

Figure 3:
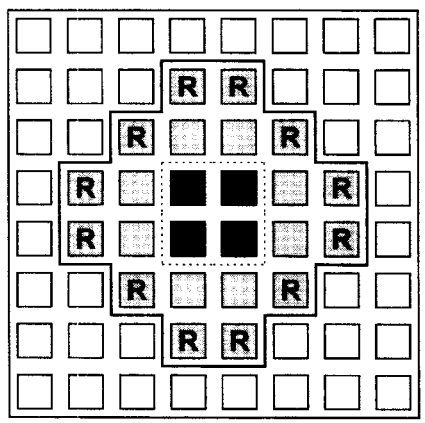
FIG. 3 shows an included domain, a four connected path surrounding the inclusion, and the domain's peripheral subset.

For example, FIG. 3 contains three domains colored in white, gray and black respectively. The boundary between the white and gray domains is shown as a solid black line. The boundary between the black and gray domains is shown as a dashed line. The white domain is external to the gray domain and the gray domain is external to the black domain. The black domain is internal to the gray domain and the gray domain is internal to the white domain. The peripheral subset of the gray domain is labeled R.

Figure 4:
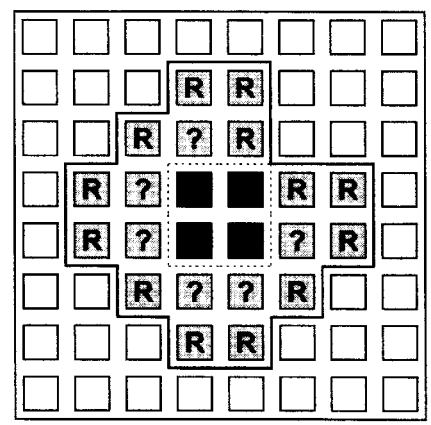
FIG. 4 shows an included domain, an eight connect path surrounding the inclusion, and the domain's peripheral subset.

The classification of a location as peripheral is dependent upon the definition of an external domain. Depending upon the connectivity rules for domains, different interpretations are possible. For instance, FIG. 4 is a slightly altered version of FIG. 3. If domains are eight connected, it is possible for the black and white pixels on FIG. 4 to make up a single domain. Because of this possibility, the only topological interpretation that is invariably valid is for the black pixels to be external to the gray domain. If domains are four connected, however, the black and white pixels are unambiguously in separate domains. Because of the clear separation, it is possible to interpret the black domain as either internal or external to the gray domain.

Since four connected domains are more commonly used than eight connected domains it is desirable to develop topological definitions for four connected domains that are optimal for geometry implicit sampling. For the purposes of sampling, it is important to minimize the size of R. Further, R should contain only extreme locations. For these reasons, domains such as the black domain of FIG. 4 should be classified as internal to domains such as the adjacent gray domain.

A succinct definition that maximizes the number of internal four connected domains involves eight connected paths. A domain is internal to a surrounding domain if there exists an eight connected path through the surrounding domain that completely encloses the internal domain. An adjacent domain that is not internal is external. Under this definition, the locations labeled R on FIG. 4 are the in peripheral subset of the gray domain and the locations labeled ? are not.

Primary Sample Locations

The primary sample locations of a chord are two-dimensional, rounded versions of the locations specified in an appropriate order one-dimensional sample location vector. The primary sample location vector, P, contains the primary sample locations. For a vertical chord, P is formed from I and a vector, $x_c$, formed by replicating $x_c$, as follows $$P=[(x_c, \text{round}(I))]. \tag{24}$$

For a horizontal chord, P is $$P=[(\text{round}(I), y_c)]. \tag{25}$$

For example, $l_{min}$ and $l_{max}$ are zero and seven respectively for domain H on FIG. 2, and to four significant figures the third order one-dimensional sample location vector for domain H is $$I_3(H) = \begin{bmatrix} 0 \\ 1.935 \\ 5.065 \\ 7 \end{bmatrix}. \tag{26}$$

The third order primary sample location vector for domain H is obtained from $I_3(H)$ by rounding the one-dimensional sample locations to the nearest integer and appending the invariant y coordinate of the domain to each rounded location:

$$P_3(H) = \begin{bmatrix} (0, 4) \\ (2, 4) \\ (5, 4) \\ (7, 4) \end{bmatrix}. \tag{27}$$

As a second example, the third order primary sample location vector for domain V is $$P_3(V) = \begin{bmatrix} (1, 0) \\ (1, 2) \\ (1, 5) \\ (1, 7) \end{bmatrix}. \tag{28}$$

Secondary Sample Locations

Secondary sample locations are selected from the primary sample locations of a chord. For a given sampled polynomial order there are one fewer secondary sample locations than primary sample locations. For example, for a third order polynomial three secondary locations are selected from the four primary locations.

Secondary location selection is performed by substituting in turn a priority location, $l_p$, for each primary sample location and forming candidate location vectors. The magnitude of the appropriate order one-dimensional determinant is evaluated for each candidate vector while removing any influence of zero factors from the result. The candidate vector producing the largest determinant magnitude is retained with ties broken by selecting the first candidate so tied. The secondary sample location vector is formed by removing the priority location from the retained candidate vector.

For example, if the priority location for chord H on FIG. 2 is its intersection with chord V, the four candidate vectors formed by priority location substitution are $$\begin{bmatrix} l_p \\ l_1 \\ l_2 \\ l_3 \end{bmatrix} = \begin{bmatrix} (1, 4) \\ (2, 4) \\ (5, 4) \\ (7, 4) \end{bmatrix}, \begin{bmatrix} l_0 \\ l_p \\ l_2 \\ l_3 \end{bmatrix} = \begin{bmatrix} (0, 4) \\ (1, 4) \\ (5, 4) \\ (7, 4) \end{bmatrix}, \tag{29}$$

$$\begin{bmatrix} l_0 \\ l_1 \\ l_p \\ l_3 \end{bmatrix} = \begin{bmatrix} (0,4) \\ (2,4) \\ (1,4) \\ (7,4) \end{bmatrix}, \begin{bmatrix} l_0 \\ l_1 \\ l_2 \\ l_p \end{bmatrix} = \begin{bmatrix} (0,4) \\ (2,4) \\ (5,4) \\ (1,4) \end{bmatrix}.$$

Evaluation of $D_3$ for each candidate yields $1\cdot4\cdot6\cdot3\cdot5\cdot2=720$, $1\cdot5\cdot7\cdot4\cdot6\cdot2=1680$, $2\cdot1\cdot7\cdot1\cdot5\cdot6=420$, and $2\cdot5\cdot1\cdot3\cdot1\cdot4=120$ respectively. Retaining the candidate vector with the largest magnitude and removing the priority location yields $$S_3(H) = \begin{bmatrix} (0,4) \\ (5,4) \\ (7,4) \end{bmatrix} \quad (30)$$

as the secondary sample location vector for chord H.

Mixed Sample Locations

Pure polynomial terms are either constant or contain only one variable. They are recoverable from collinear points such as those obtained by sampling domain chords. However, separation of mixed polynomial terms from pure terms requires sample locations that are not collinear with two or more other sample location. The second order polynomial is the lowest order polynomial in which a mixed term appears and for which mixed sampling is required.

To determine proper sample locations to support mixed terms, it is again useful to turn to problem separation. Mixed polynomial terms are isolated by recovering the pure terms with one-dimensional sampling and shifting the coordinate origin for the mixed terms to the intersection of the domains from which the pure terms are recovered. Under this transformation the second order system of recovery equations reduces from $$\begin{bmatrix} c_{x^2}x_1^2 & c_{y^2}y_1^2 & c_{xy}x_1y_1 & c_xx_1 & c_yy_1 & 1 \\ c_{x^2}x_2^2 & c_{y^2}y_2^2 & c_{xy}x_2y_2 & c_xx_2 & c_yy_2 & 1 \\ c_{x^2}x_3^2 & c_{y^2}y_3^2 & c_{xy}x_3y_3 & c_xx_3 & c_yy_3 & 1 \\ c_{x^2}x_4^2 & c_{y^2}y_4^2 & c_{xy}x_4y_4 & c_xx_4 & c_yy_4 & 1 \\ c_{x^2}x_5^2 & c_{y^2}y_5^2 & c_{xy}x_5y_5 & c_xx_5 & c_yy_5 & 1 \\ c_{x^2}x_6^2 & c_{y^2}y_6^2 & c_{xy}x_6y_6 & c_xx_6 & c_yy_6 & 1 \end{bmatrix} \begin{bmatrix} c_{x^2} \\ c_{y^2} \\ c_{xy} \\ c_x \\ c_y \\ c \end{bmatrix} = \begin{bmatrix} z_1 \\ z_2 \\ z_3 \\ z_4 \\ z_5 \\ z_6 \end{bmatrix}$$

to $$[x_1y_1]\cdot[c_{xy}]=[z_1] \quad (31)$$

The reduced system has a tractable determinant $$D_{m2}=x_1y_1, \quad (32)$$

but the determinant has no local structure and the maximum occurs at some point at the domain's periphery. Since a freeform two-dimensional domain has no guaranteed boundary structure, a closed form solution for the location with maximal $Dm_2$ does not exist. However, the search space is small enough to address with a procedural search.

Referencing $D_{m2}$ to a chord intersection yields the separated second order cost function $$C_{21}(x,y)=|(x-x_c)(y-y_c)|. \quad (33)$$

The optimal separated second order mixed sample location occurs at the peripheral location where $C_{21}$ is maximal $$m_{21}=(x,y)_i \in R: \forall_{j \neq i}(C_{21}(x_i,y_i) \geq C_{21}(x_j,y_j)). \quad (34)$$

and the second order mixed sample location vector contains a single element $$M_2=[m_{21}]. \quad (35)$$

For third order polynomials, the separated mixed system of recovery equations contains three samples and three unknown coefficients $$\begin{bmatrix} x_1y_1 & x_1y_1^2 & x_1^2y_1 \\ x_2y_2 & x_2y_2^2 & x_2^2y_2 \\ x_3y_3 & x_3y_3^2 & x_3^2y_3 \end{bmatrix} \cdot \begin{bmatrix} c_{xy} \\ c_{xy^2} \\ c_{x^2y} \end{bmatrix} = \begin{bmatrix} z_1 \\ z_2 \\ z_3 \end{bmatrix}. \quad (36)$$

Even though the separated third order mixed determinant $$D_{m3}=x_1y_1x_2y_2x_3y_3(x_1y_2-x_2y_1+x_3y_1-x_1y_3+x_2y_3-x_3Y_2) \quad (37)$$

is much reduced from the complete third order recovery determinant, direct optimization is still computationally expensive for large domains since the size of the search space is proportional to the cube of the number of possible locations. Since a primary goal of geometry implicit sampling is to efficiently find near optimal sample locations, the third order search complexity must be further reduced.

One way to reduce the search complexity is to build up an approximately optimal set one location at a time. For such a search the computational complexity is proportional to the number of domain locations. However, an incremental search requires three separate cost functions for one, two, and three points respectively. Problem separation can again be used to determine appropriate incremental cost functions.

An appropriate cost function for a single location is obtained by removing the two highest order terms and two sample locations from the full third order mixed recovery matrix and taking the determinant of the result. This procedure yields the same cost function as was obtained for the second order mixed location $$C_{31}(x,y)=C_{21}(x,y). \quad (38)$$

A cost function for finding an optimal second location when one is known is obtained by removing the lowest order term and one sample location from the full matrix and taking the determinant. Eliminating the fixed multiplicative constant, shifting the reference coordinate system and fixing location $(x_1,y_1)$ yields the desired result $$C_{32}(x,y)=|(x-x_c)(y-y_c)((x_1-x_c)(y-y_c)-(x-x_c)(y_1-y_c))|. \quad (39)$$

A cost function for finding an optimal third location when two are known is obtained from $D_{m3}$ by dropping the fixed multiplicative constant, shifting the reference coordinate system, and fixing locations $(x_1,y_1)$ and $(x_2,y_2)$ $$C_{33}(x,y) = \quad (40)$$
$$\left| \begin{array}{c} (x-x_c)(y-y_c)((x-x_c)(y_2-y_1)+(y-y_c)(x_1-x_2)+\ldots \\ (x_2-x_c)(y_1-y_c)-(x_1-x_c)(y_2-y_c)) \end{array} \right|.$$

Experimental evidence suggests that at least two optimal third order mixed sample locations must lie within the domain's peripheral subset. The third optimal location is either within R or lies at one of the alternate locations $(x_1,y_2)$ or $(x_2,y_1)$. The alternate locations are possible only if both $x_1 \neq x_2$ and $y_1 \neq y_2$. Since the alternate locations are the opposing vertices of a rectangle defined by two peripheral locations, only one alternate location is likely to lie within the domain being sampled. The set X contains the alternate locations that lie within the domain.

Restricting the search for each location to R or R∪X reduces the search complexity to O(|R|). Sequentially performing three searches $$m_{31}=(x,y)_i \in R: \forall_{j \neq i}(C_{31}(x_i,y_i) \geq C_{31}(x_j,y_j)) \quad (41)$$

$$m_{32}=(x,y)_i \in R: \forall_{j \neq i}(C_{32}(x_i,y_i) \geq C_{32}(x_j,y_j)) \quad (42)$$

$$m_{33}=(x,y)_i \in R \cup X: \forall_{j \neq i}(C_{33}(x_i,y_i) \geq C_{33}(x_j,y_j)) \quad (43)$$

yields three third order mixed sample locations. The third order mixed sample location vector is formed from the mixed sample locations $$M_3 = \begin{bmatrix} m_{31} \\ m_{32} \\ m_{33} \end{bmatrix}. \quad (44)$$

Figure 5:
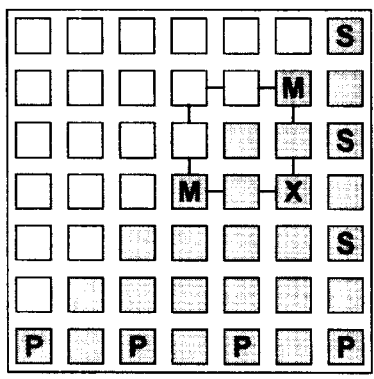
FIG. 5 shows how one mixed sample location determined by the present invention can be non-peripheral.

FIG. 5 is an example primary, secondary, and mixed sampling of a right triangle where the optimal location for $m_{33}$ is at the single location in X. Note that only one of $(x_1,y_2)$ and $(x_2,y_1)$ lies within the domain defined by the right triangle.

The Two-dimensional Geometry Implicit Sampler

Thus far individual pieces of a geometry implicit sampler have been described: primary and secondary one-dimensional sampling, and mixed sampling. The pieces are combined to form a fast geometry implicit sampler as follows:

1. Identify a relatively important horizontal chord.
2. Identify a relatively important vertical chord.
3. Identify the more important of the previously identified horizontal and vertical chords as the primary chord and the remaining chord as the secondary chord.
4. Perform an appropriate order primary sampling of the primary chord to yield a primary sample vector P.
5. Using the chord intersection as the priority location perform an appropriate order secondary sampling of the secondary chord to yield a secondary sample vector S.
6. Using the primary and secondary chord intersection as the reference coordinate system, perform an appropriate order mixed sampling of the union of R and X to yield a mixed sample vector M.
7. Form a two-dimensional sample vector by concatenating the three individual vectors $$T = \begin{bmatrix} P \\ S \\ M \end{bmatrix}. \quad (45)$$

This basic sampler is incomplete in two ways. First a method is needed for identifying relatively important primary and secondary chords. Second the basic sampler is not appropriate for completely freeform domains. For concave or included domains, the sample locations determined by the basic sampler may not lie within the sampled domain. For domains with restricted extent in one or more directions, one or more sample locations may be duplicated or otherwise inappropriate. However, these deficiencies are addressable by efficient extensions of the basic method.

Chord Selection

An important item required for efficient two-dimensional sampling of a domain is a mechanism for determining two orthogonal chords with which to anchor the sampling. The optimal two chords are the chords that jointly maximize the primary, secondary, and mixed determinants. However, the computation required to determine optimal chords is disproportionate to the rest of the sampling method. Primary, secondary and mixed sampling are O(|R|) where |R| is the size the domain's peripheral subset. Determination of appropriate primary and secondary chords must be of commensurate computational complexity.

One way to achieve this complexity bound is to independently select each chord. That is, determine the relative importance of a chord solely from direct properties of that chord. This is another form of problem separation.

The following three independent measures of chord importance have been found to yield good sampling patterns on domains whose shapes have been smoothed to minimize concavities and inclusions.

The length of a chord is one less than the number of locations through which it passes.

The weight of a chord is the number of locations on the chord that lie within its domain.

The dominance of a chord is the product of its length and weight.

Of the three measures, chord length is the only one directly computable in O(|R|) time for all chords of a domain. However, chord weight and therefore dominance are generally available as byproducts of operations that must be performed in conjunction with domain sampling. Chord length is an optimal independent importance measure for convex domains with no inclusions. Chord weight and dominance are approximately optimal importance measures for concave or included domains.

Figure 8:
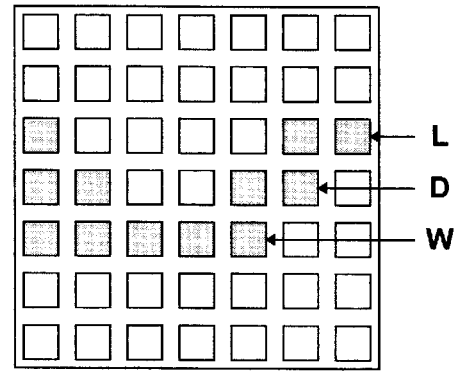
FIG. 8 shows the longest, heaviest, and most dominant of three horizontal chords.

The longest, heaviest, and dominant horizontal chords for the gray domain in FIG. 8 are labeled with L, W, and D respectively. The three chords show how dominance is a mixture of length and weight. The figure also reinforces that length is always the best importance measure for first order sampling. For horizontal primary sampling of the domain of FIG. 8 chord L is optimal for second order sampling and chord D is optimal for third order sampling. Even though for this example, chord L is superior to chord D for second order sampling, dominance is generally the best importance measure for both second and third order sampling.

Concavities and Inclusions

Figure 6:
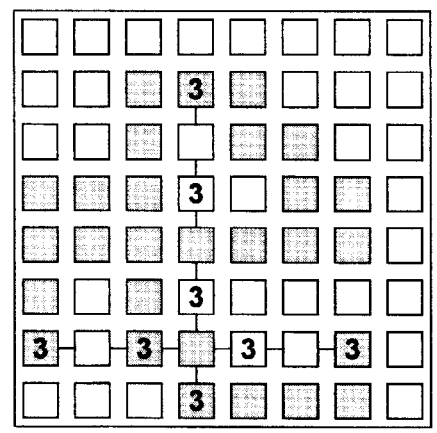
FIG. 6 shows how chords can be broken by domain concavities and inclusions.

Due to concavities and inclusions, a chord of a freeform two-dimensional domain may not form a connected one-dimensional domain. For example, the vertical and horizontal chords of the gray domain shown on FIG. 6 are not connected. Since the chords are broken, interior one-dimensional sample locations may fall outside of the encompassing two-dimensional domain. Chord locations falling outside of the encompassing domain are extrinsic and those falling inside are intrinsic. On FIG. 6 third order primary sample locations are labeled with 3 on two broken chords. Two sample locations on the vertical chord and one location on the horizontal chord are extrinsic.

Extrinsic sample locations are not guaranteed to lie within the dynamic range of the image and therefore are unsuitable sample locations for the encompassing domain. Every extrinsic sample location has a closest intrinsic location in the direction of $l_{min}$ and a closest intrinsic location in the direction of $l_{max}$. For extrinsic location $l_e$, the closest intrinsic locations are defined $l_{e-}$ and $l_{e+}$ respectively.

When primary sampling at any order on any chord, broken or not, the chord endpoints are optimal sample locations. For first order sampling the only sample locations are the chord endpoints, so no additional effort is required to sample broken chords.

When second order sampling a broken chord, the middle location, $l_1$, is possibly extrinsic. If so, the best available intrinsic location is either $l_{1-}$ or $l_{1+}$. One way to determine which of the two is superior is to select the candidate producing the largest $|D_{12}|$. However, in this situation the optimal intrinsic location is always located at the minimum possible distance from $l_1$. Therefore an extrinsic second order sampling is made intrinsic by substituting the closer of $l_{1-}$ or $l_{1+}$ for $l_1$.

Figure 7:
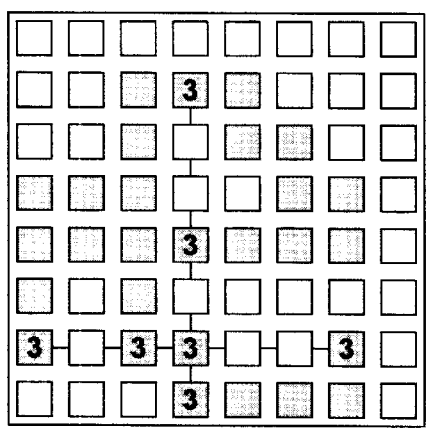
FIG. 7 shows intrinsic one-dimensional sample locations for broken vertical and horizontal chords.

When primary sampling a broken chord for third order locations, either or both of $l_1$ and $l_2$ may be extrinsic. Because of the two degrees of freedom, the optimal pair of internal intrinsic locations is not, in general, some combination of $l_{1-}$, $l_{1+}$, $l_{2+}$, and $l_{2-}$. However, for domains with relatively few concavities and inclusions, an approximate procedure that has proven adequate is to substitute for each extrinsic sample location, $l_e$, the closer of $l_{e-}$ or $l_{e+}$. Ties are broken by arbitrarily preferring locations nearer to $l_{min}$. An intrinsic primary sampling of FIG. 6 is shown in FIG. 7.

A extension of this approximation has proven adequate to perform secondary sampling of broken chords. To perform intrinsic secondary sampling of a broken chord, the primary sample vector from which candidate vectors are formed is made intrinsic as just described. Secondary location selection then proceeds normally. The sample pattern of FIG. 7 can be viewed as either an intrinsic primary sampling of the vertical chord and an intrinsic secondary sampling of the horizontal chord or vice versa.

When performing mixed sampling, all possible sample locations other than those in X are peripheral and therefore intrinsic. Since extrinsic alternate locations are eliminated from X by the basic sampler, the locations of X are also intrinsic. Therefore, the mixed locations determined by the basic sampler need not be adjusted for concave or included domains. The reason that elimination of extrinsic locations from X is performed by the basic sampler and not by an extension is that it is rare in practice for a location excluded from X to be extrinsic due to a domain concavity or inclusion.

Eliminating Redundant Locations

The basic sampler is carefully constructed to always produce one sample location per term of the sampled polynomial. However, certain domain shapes cannot support the full complement of independent samples. For example, a domain containing a single pixel can only support one polynomial term. A domain on only one column cannot support polynomial terms containing x. A domain on only one row cannot support terms in y. A domain lying in only one row and column cannot support mixed terms.

When a domain cannot support the full complement of sample locations, some locations are redundant and must be identified as such to maintain a critical sampling. The sample vectors produced by the basic sampler have certain properties that facilitate the identification of redundant locations.

The primary sample location vector is always arranged in order of increasing secondary coordinate. Because of this, a redundant location is identical to the location just preceding it in P. Therefore, redundant primary samples are identified by scanning the primary location vector from the minimum to maximum index and marking any location that is identical to the preceding location as redundant.

Similarly the secondary sample location vector is always arranged in order of increasing primary coordinate. However, the secondary vector may also contain the intersection of the primary and secondary chords. Because the primary chord is well represented by sample locations in the primary vector it is undesirable to have secondary locations fall on the primary chord. Therefore, redundant secondary samples are identified by scanning the secondary location vector from the minimum to maximum index and marking any location that is identical to the preceding location or that is identical to the chord intersection as redundant.

Mixed sample locations are redundant in several ways. Mixed locations on either the primary or secondary chord are redundant. If three mixed locations are collinear, one is redundant. If two locations are collinear with the chord intersection, one is redundant. In all cases the associated determinant of the redundant location is zero. Since the relevant determinants are computed as part of mixed sampling, they are available to facilitate redundant location identification. If the determinant magnitudes are retained in a vector $D_m$ then redundant mixed samples are identified by scanning the mixed location vector from minimum to maximum index and marking any location with corresponding zero entry in $D_m$ as redundant.

Polynomial Recovery from a Reduced Number of Samples

When sample locations are marked as redundant, they are essentially eliminated from the sample location vector. No corresponding sample value need be transmitted by an encoder and none need be expected by a decoder. However, some mechanism is needed for recovering a reduced polynomial from the non-redundant samples.

A system of equations for recovering a maximal first order two-dimensional polynomial from samples was shown in (7). Second and third order polynomials are recoverable from similar systems containing six and ten terms respectively. Such equations are written in abbreviated form as $$A \cdot x = b. \qquad (46)$$

When there are fewer equations than unknowns, such as when redundant sample locations occur in geometry implicit sampling, the sample location matrix, A, and sample value vector, b, have fewer rows than the unknown coefficient vector x. In such situations a reduced polynomial is recoverable if one row is eliminated from x and one column eliminated from A for each polynomial term not supported by the sample data. The sample location vector, T, produced by the extended sampler is arranged to facilitate identification of the polynomial terms not supported by domain geometry.

The polynomial terms to eliminate from the recovery equations are identified as follows. For every redundant location of P, remove one pure polynomial term in the direction of the primary chord beginning with the term with the largest exponent. For every redundant location of S, remove one pure polynomial term in the direction of the secondary chord beginning with the term with largest exponent. For a second order polynomial, if the single element of M is redundant remove the polynomial term in xy.

For a third order M with one redundant element, remove the polynomial term in $x^2y$ if the two non-redundant locations of M differ in y more than in x, otherwise remove the term in $xy^2$. When M contains two redundant elements, remove the terms in $x^2y$ and $xy^2$. When three redundant mixed locations occur, remove all three mixed polynomial terms.

An alternate method of polynomial recovery that automatically determines supported polynomial terms is disclosed in a copending U.S. patent application by the present inventor entitled "Image Partition Moment Operators" that was filed on Jun. 8, 1997 the disclosure of which is incorporated herein by reference.

Examples

FIGS. 9–40 show optimal and approximately optimal geometry implicit samplings of several example domains.

The figures are paired, with the odd numbered figures showing the optimal sample locations and the even numbered figures showing the approximately optimal sample locations determined by the geometry implicit sampler described herein. In the odd figures the optimal sample locations are labeled O. In the even figures, primary sample locations are labeled with P, secondary locations are labeled with S, and mixed locations are labeled with M. For most of the figures there is more than one optimal sampling. In all cases, the optimal sampling most closely matching the corresponding approximate sampling is shown.

The determinant of the sample recovery matrix formed from the labeled sample locations is shown beneath each figure. The determinant for each optimal sampling, $D_O$, is always greater than or equal to the determinant for the corresponding approximately optimal sampling, $D_I$.

The optimal sample locations were determined by evaluating the appropriate determinant for all possible patterns of sample locations and selecting the pattern producing the largest determinant magnitude. Even after optimizing the search to take advantage of symmetry, determination of optimal third order sample locations would have required days or weeks of CPU time on a 200 MHz Intel Pentium processor. Therefore, four locations were fixed by "guessing" and the remaining six locations were optimized by exhaustive search.

In all cases the approximate sample locations were determined using chord dominance as the chord importance measure. Ties were broken by favoring horizontal chords over vertical chords and by favoring chords at more negative coordinates under the coordinate system of FIG. 1. Determination of the approximate sample locations is much faster than optimal search, requiring less than 100 microseconds of CPU time per example.

Figure 9:
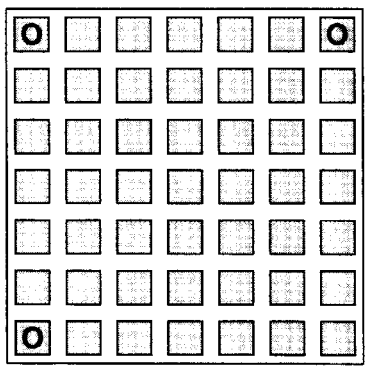
FIG. 9 shows optimal first order sample locations for a 7×7 square domain.
Figure 10:
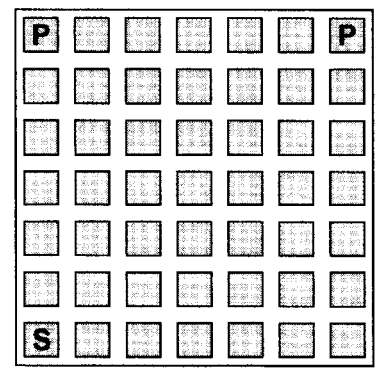
FIG. 10 shows the approximately optimal sample pattern determined according to the present invention that corresponds to the optimal sample pattern of the previous figure.
Figure 11:
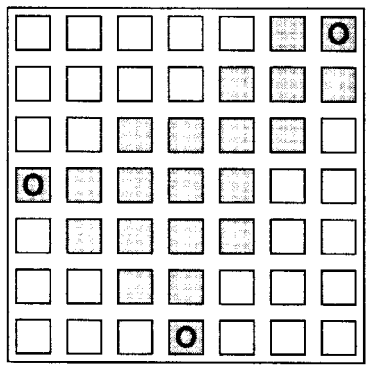
FIG. 11 shows optimal first order sample locations for a diagonally oriented acute triangle.
Figure 12:
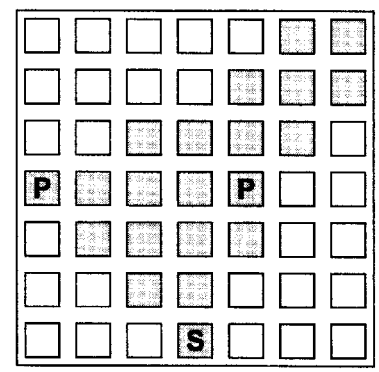
FIG. 12 shows the approximately optimal sample pattern determined according to the present invention that corresponds to the optimal sample pattern of the previous figure.
Figure 13:
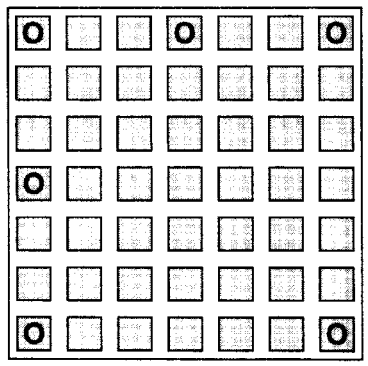
FIG. 13 shows optimal second order sample locations for a square domain.
Figure 14:
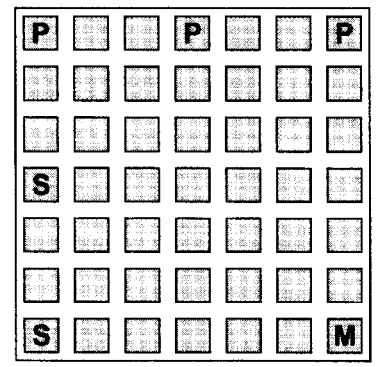
FIG. 14 shows the approximately optimal sample pattern determined according to the present invention that corresponds to the optimal sample pattern of the previous figure.
Figure 15:
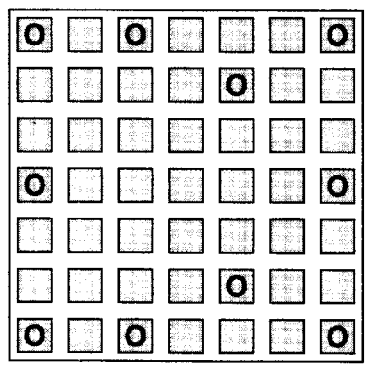
FIG. 15 shows optimal third order sample locations for a square domain.
Figure 16:
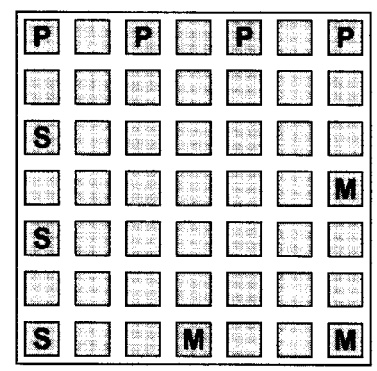
FIG. 16 shows the approximately optimal sample pattern determined according to the present invention that corresponds to the optimal sample pattern of the previous figure.

The first two examples illustrate first order sampling. The optimal first order sample locations for a 7×7 square domain are shown in FIG. 9 and approximate sample locations for the same domain are shown in FIG. 10. This example was contrived so that the optimal locations and approximate sample locations are identical. This only occurs for compact domains with rectilinear symmetry. Diagonally aligned domains with high aspect ratio are the adversary for the approximate sampler. FIG. 11 and FIG. 12 show how $D_I$, degrades from $D_O$ on a diagonally aligned acute triangle. As aspect ratio increases the approximate determinant magnitude degrades further.

Second and third order sample patterns have a more interesting structure and are the focus of the remaining examples. The previously shown square is second order sampled in FIG. 13 and FIG. 14. Again the optimal and approximate samplings are identical. At third order, shown in FIG. 15 and FIG. 16, $D_I$ is slightly degraded from $D_O$.

Figure 17:
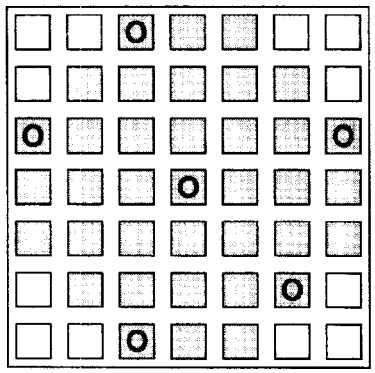
FIG. 17 shows optimal second order sample locations for a circular domain whose diameter is six.
Figure 18:
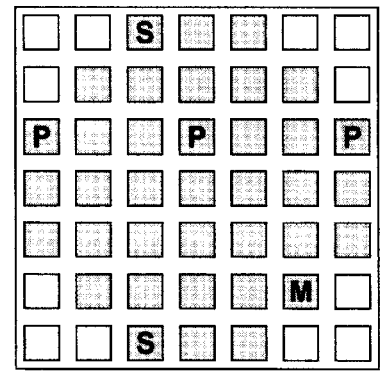
FIG. 18 shows the approximately optimal sample pattern determined according to the present invention that corresponds to the optimal sample pattern of the previous figure.
Figure 19:
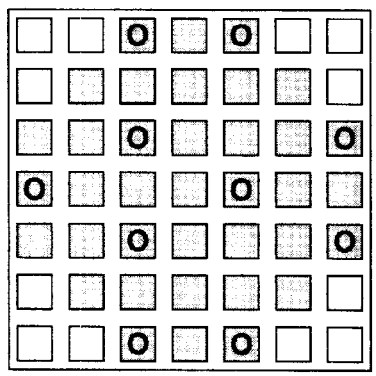
FIG. 19 shows optimal third order sample locations for a circle.
Figure 20:
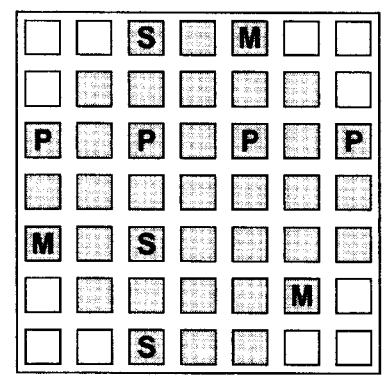
FIG. 20 shows the approximately optimal sample pattern determined according to the present invention that corresponds to the optimal sample pattern of the previous figure.
Figure 21:
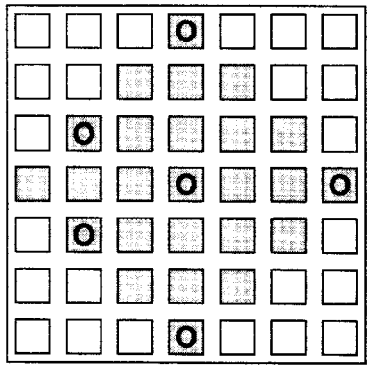
FIG. 21 shows optimal second order sample locations for a diamond shaped domain whose maximum chord length is six.
Figure 22:
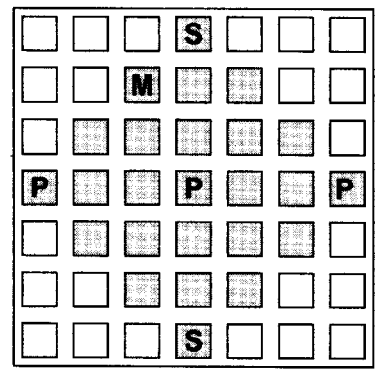
FIG. 22 shows the approximately optimal sample pattern determined according to the present invention that corresponds to the optimal sample pattern of the previous figure.
Figure 23:
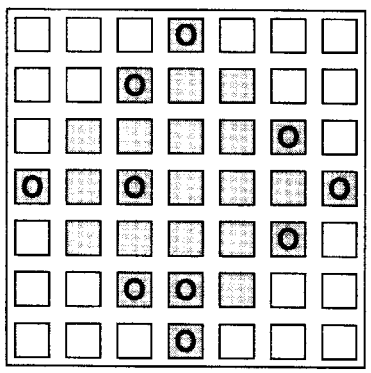
FIG. 23 shows optimal third order sample locations for a diamond.
Figure 24:
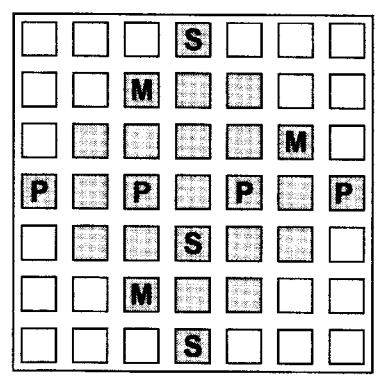
FIG. 24 shows the approximately optimal sample pattern determined according to the present invention that corresponds to the optimal sample pattern of the previous figure.

Second order locations for a diameter six circle are shown in FIG. 17 and FIG. 18. Again the optimal and approximate patterns are the same. The third order optimal locations of FIG. 19 are similar to the approximate locations of FIG. 20. The overall quality of the approximate result is similar to that of the square.

Second and third order locations for a 7×7 diamond (rotated square) are shown in FIG. 21, FIG. 22, FIG. 23, and FIG. 24. This shape presents a more difficult problem for the approximate sampler since its boundaries are diagonally aligned. However, since it is fairly compact its $D_I$ is within a factor of two of its $D_O$.

Figure 25:
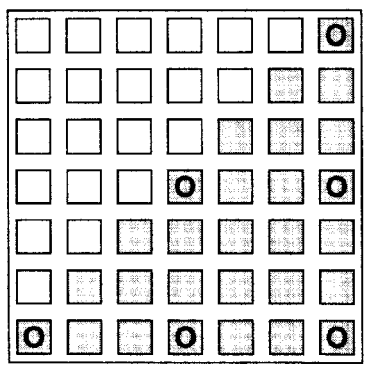
FIG. 25 shows optimal second order sample locations for a right triangle whose base length is six.
Figure 26:
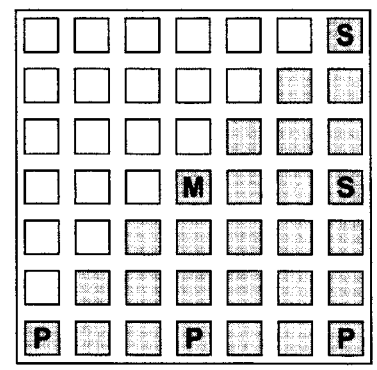
FIG. 26 shows the approximately optimal sample pattern determined according to the present invention that corresponds to the optimal sample pattern of the previous figure.
Figure 27:
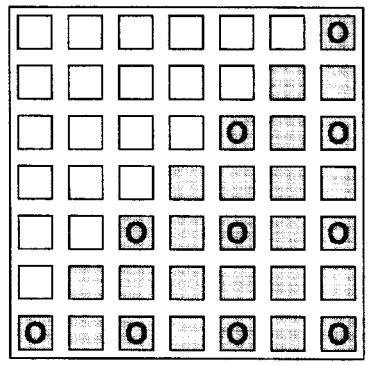
FIG. 27 shows optimal third order sample locations for a right triangle.
Figure 28:
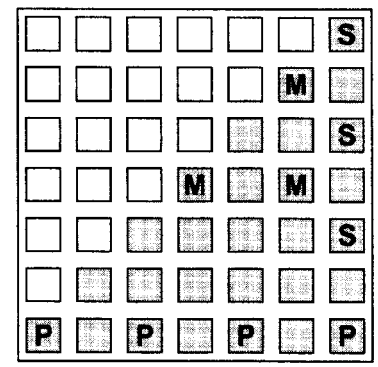
FIG. 28 shows the approximately optimal sample pattern determined according to the present invention that corresponds to the optimal sample pattern of the previous figure.

The next example domain is a right triangle. The second order optimal and approximate sample patterns of FIG. 25 and FIG. 26 are identical. At third order, FIG. 27 and FIG. 28, $D_I$ is within a factor of two of $D_O$. In the approximate pattern, one mixed sample location is placed at the single location in X. Note the extreme regularity of the optimal sample pattern.

Figure 29:
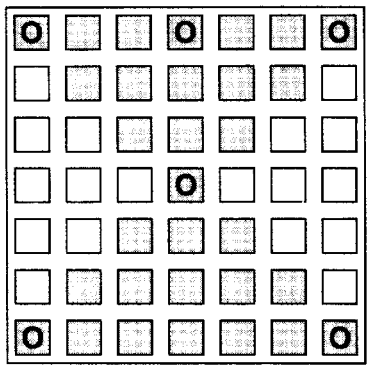
FIG. 29 shows optimal second order sample locations for a concave domain shaped like an hourglass.
Figure 30:
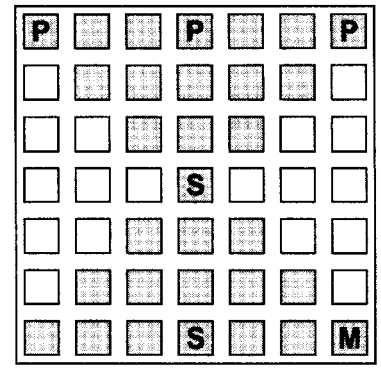
FIG. 30 shows the approximately optimal sample pattern determined according to the present invention that corresponds to the optimal sample pattern of the previous figure.
Figure 31:
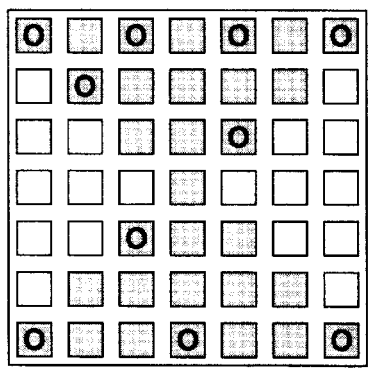
FIG. 31 shows optimal third order sample locations for an hourglass domain.
Figure 32:
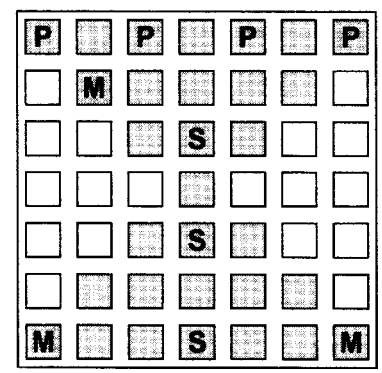
FIG. 32 shows the approximately optimal sample pattern determined according to the present invention that corresponds to the optimal sample pattern of the previous figure.

A concave hourglass domain is the next example. Again the optimal sample pattern, FIG. 29, is identical to the approximately optimal pattern, FIG. 30. At third order, FIG. 31 and FIG. 32, the patterns are different but $D_I$ is again within a factor of two of $D_O$.

Figure 33:
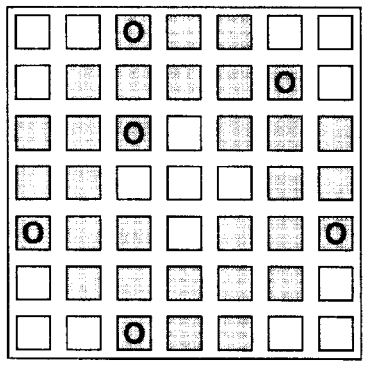
FIG. 33 shows optimal second order sample locations for a domain shaped like an annulus.
Figure 34:
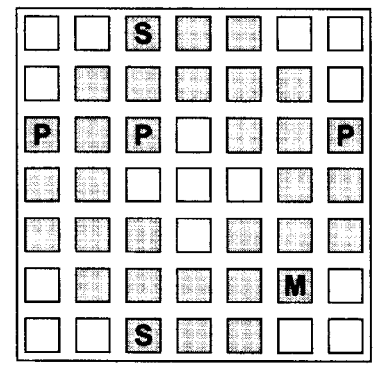
FIG. 34 shows the approximately optimal sample pattern determined according to the present invention that corresponds to the optimal sample pattern of the previous figure.
Figure 35:
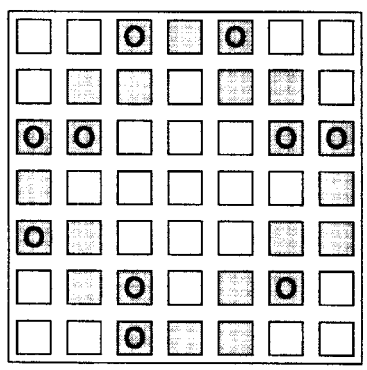
FIG. 35 shows optimal third order sample locations for an eroded annulus.
Figure 36:
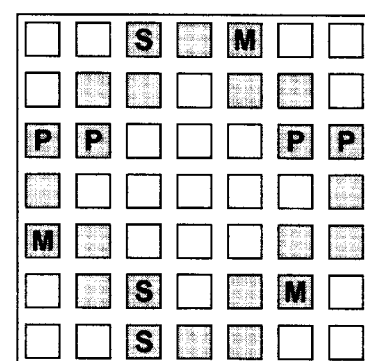
FIG. 36 shows the approximately optimal sample pattern determined according to the present invention that corresponds to the optimal sample pattern of the previous figure.

Second order sample patterns for an annulus are shown in FIG. 33 and FIG. 34. The approximate pattern is extremely close to optimal. For the third order examples of FIG. 35 and FIG. 36, the annulus has been further eroded. The additional erosion has forced the optimal and geometry samples to the same locations.

Figure 37:
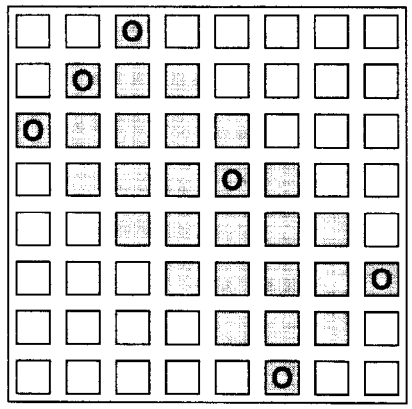
FIG. 37 shows optimal second order sample locations for a diagonally oriented domain with a high aspect ratio.
Figure 38:
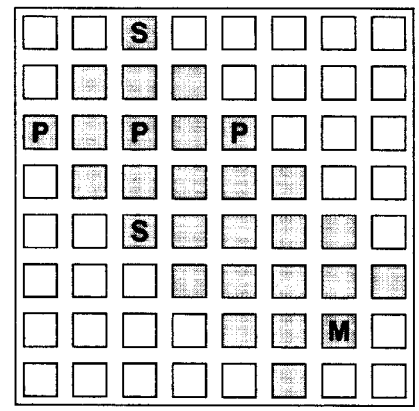
FIG. 38 shows the approximately optimal sample pattern determined according to the present invention that corresponds to the optimal sample pattern of the previous figure.
Figure 39:
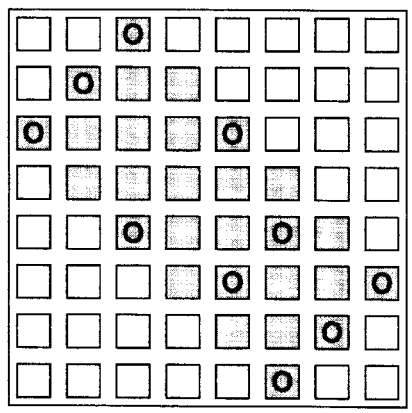
FIG. 39 shows optimal third order sample locations for a diagonally oriented stripe.
Figure 40:
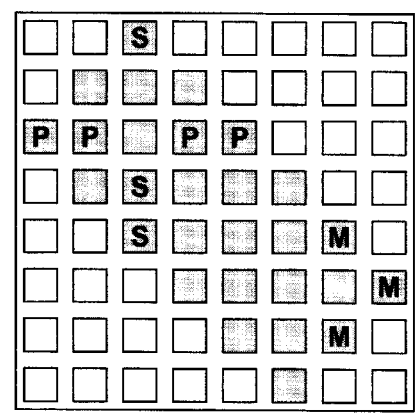
FIG. 40 shows the approximately optimal sample pattern determined according to the present invention that corresponds to the optimal sample pattern of the previous figure.

The final example domain is the adversary for the approximate sampler: a high aspect ratio diagonal stripe. FIG. 37 and FIG. 38 show second order sample patterns and FIG. 39 and FIG. 40 show third order patterns. At third order, $D_I$ is significantly less than $D_O$.

Analysis of the Examples

The most interesting aspect of the examples is the highly uniform distribution of the optimal sample locations. It seems possible that a first order geometry implicit sampling method based upon vertical and horizontal extrema could achieve optimal results with $O(|R|)$ computational complexity. However, it is quite likely that determination of optimal higher order patterns such as those of FIG. 25 and FIG. 26 is only possible via techniques that have much higher computational complexity.

The patterns determined by the approximate sampler approach optimal in most cases. Significant departure from optimality occurs only on higher aspect ratio diagonally oriented domains. Modification of the approximate sampler to include diagonal chords would produce a more optimal result. However, experimental results from a two-dimensional model based image coder/decoder that uses the approximate sampler described here indicate that the increase in computational complexity entailed by diagonal chords is not justified by the relatively small improvement in recovered polynomial accuracy. First, the experimental data indicate that high aspect ratio diagonally oriented domains are uncommon in practice. Second, the degradation in recovered polynomial accuracy is not as severe as the determinant ratio would naively indicate. The collinearity of the primary and secondary sample locations seems to limit the ways in which pathological sample value combinations can distort the recovered polynomial.

Application to Image Coding

FIG. 41 is a high level pseudocode description of a two-dimensional model based image encoder that is appropriate for grayscale images. Operations that produce portions of the coded bit stream are followed with *. Indentation indicates that an operation is executed multiple times.

The encoder first extracts a two-dimensional model from an input image. Each polynomial intensity function of the extracted model is of the same order in this encoder but may be variable in a slightly more complex encoder. The model order, O, is encoded first followed by the boundaries delineating the domains of the model. The domain polynomial intensity functions are then coded in turn via quantized geometry implicit sampling.

The geometry implicit sampler determines both the number and locations of appropriate sample values. The taken sample values are then quantized and encoded. The rate at which each domain is encoded is determined by a quantizer step size, S. The quantizer step size is variable and is placed in the code stream just prior to each domain's quantized sample values.

A corresponding two-dimensional model based decoder is shown in FIG. 42. The global model order, O, is decoded first followed by the boundaries delineating the domains of the model. For each domain a quantizer step size, S, is decoded, followed by sample values. The number and locations of the domain sample values are determined by order O geometry implicit sampling. The sampler used in the decoder must duplicate the operation of the sampler used by the encoder. As each sample value is decoded, it is inverse quantized using S. The full complement of samples for the domain is then used to recover a polynomial intensity function. The intensity function determines the intensities of the domain's pixels.

I claim:

1. In an image coding process wherein an image is decomposed into a multiplicity of discrete freeform two-dimensional domains, and wherein the pixels of each domain are modeled via a two-dimensional polynomial intensity function of order one, two, or three, and wherein the polynomial intensity functions are represented by samples of their generated surfaces, a method for determining sample values for representing a surface over a domain or for recovering a surface over a domain from representative sample values comprising the steps of:
   a) determining a relatively important horizontal chord of the domain,
   b) determining a relatively important vertical chord of the domain,
   c) determining the relative importance of said vertical and horizontal chords and designating the more important chord the primary chord and the less important chord the secondary chord,
   d) determining without duplication one sample location on the primary chord and within the domain for each pure polynomial term in the variable of the primary chord,
   e) determining without duplication one sample location on the secondary chord, exclusive of the primary chord, and within the domain for each pure polynomial term with exponent greater than zero in the variable of the secondary chord,
   f) determining without duplication one sample location within the domain for each mixed polynomial term such that the locations lie either at the domain's periphery or at the opposing corner of a rectangle defined by two other mixed locations, do not lie on the primary or secondary chords, and are not collinear with each other or with the chord intersection, and
   g) using the determined sample locations,
      i) take surface samples and form a set of sample values representing the surface over the domain, or
      ii) associate known sample values to sample locations and recover a polynomial surface over the domain.

2. The method defined in claim 1 wherein longer chords are relatively more important than shorter chords and chords of a given length and further to one coordinate extreme are relatively more important than chords of the same length and further to the other coordinate extreme.

3. The method defined in claim 1 wherein heavier chords are relatively more important than lighter chords and chords of a given weight and further to one coordinate extreme are relatively more important than chords of the same weight and further to the other coordinate extreme.

4. The method defined in claim 1 wherein more dominant chords are relatively more important than less dominant chords and chords of a given dominance and further to one coordinate extreme are relatively more important than chords of the same dominance and further to the other coordinate extreme.

5. The method defined in claim 1 wherein the polynomial over the domain is maximal in the first degree and wherein;
   a) the determined sample locations on the primary chord are its endpoints and wherein;
   b) the determined sample location on the secondary chord is the endpoint at maximum perpendicular distance from the primary chord.

6. The method defined in claim 1 wherein the polynomial over the domain is maximal in the second degree and wherein;
   a) the determined sample locations on the primary chord are its endpoints and the domain location nearest its midpoint and wherein;
   b) the two determined sample locations on the secondary chord are selected from the three locations comprised of its endpoints and the domain location nearest its midpoint such that when the primary chord intersection is substituted for the unselected location the magnitude of $D_{12}$ is maximal, and wherein;
   c) the mixed sample location determined is the location in the coordinate system defined by the primary and secondary chords where the magnitude of the product of the horizontal and vertical coordinates is maximal.

7. The method defined in claim 1 wherein the polynomial over the domain is maximal in the third degree and wherein;
   a) the determined sample locations on the primary chord are its endpoints and the two domain locations nearest to the fraction $$\frac{5+\sqrt{5}}{10}$$

of the its length from its endpoints, and wherein;
   b) the three determined sample locations on the secondary chord are selected from the four locations comprised of its endpoints and the two domain locations nearest to the fraction $$\frac{5+\sqrt{5}}{10}$$

of the its length from its endpoints such that when the chord intersection is substituted for the unselected location the magnitude of $D_{13}$ is maximal, and wherein;
   c) the first mixed sample location determined is the location in the coordinate system defined by the primary and secondary chords where the magnitude of the product of the horizontal and vertical coordinates is maximal, and wherein;
   d) the second mixed sample location determined is the location in the coordinate system defined by the primary and secondary chords where the magnitude of the product $x_2 y_2 (x_1 y_2 - x_2 y_1)$ is maximal, and wherein;
   e) the third mixed sample location determined is the location in the coordinate system defined by the primary and secondary chords where the magnitude of the product $x_3 y_3 (y_1 x_2 - x_1 y_2 + x_1 y_3 - x_3 y_1 + x_3 y_2 - x_2 y_3)$ is maximal.

* * * * *